United States Patent
Kawai et al.

(10) Patent No.: US 9,517,762 B2
(45) Date of Patent: Dec. 13, 2016

(54) CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventors: Takashi Kawai, Gotemba (JP); Mitsumasa Fukumura, Toyota (JP); Hiroshi Sugimura, Toyota (JP); Satoshi Maeda, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/896,189

(22) PCT Filed: Jun. 4, 2014

(86) PCT No.: PCT/JP2014/064863
§ 371 (c)(1),
(2) Date: Dec. 4, 2015

(87) PCT Pub. No.: WO2014/196572
PCT Pub. Date: Dec. 11, 2014

(65) Prior Publication Data
US 2016/0114789 A1  Apr. 28, 2016

(30) Foreign Application Priority Data

Jun. 7, 2013  (JP) ................................ 2013-121022

(51) Int. Cl.
*B60W 10/06*    (2006.01)
*B60K 6/445*   (2007.10)
(Continued)

(52) U.S. Cl.
CPC ................ *B60W 20/15* (2016.01); *B60K 6/24* (2013.01); *B60K 6/445* (2013.01); *B60L 11/14* (2013.01);
(Continued)

(58) Field of Classification Search
CPC ...... B60W 20/15; B60W 10/06; B60W 10/08; B60W 20/00; B60W 2510/0685; B60W 2510/06; B60W 2710/06; B60W 2710/083; B60K 16/445; B60K 6/24; B60L 11/14; B60Y 2300/45; F02D 17/00; F02D 29/02; Y02T 10/84; Y02T 10/6286; Y02T 10/6295; Y02T 10/6239; Y10S 903/903
(Continued)

(56) References Cited

U.S. PATENT DOCUMENTS

2013/0168178 A1* 7/2013 Takagi ..................... B60K 5/06
                                                     180/291
2014/0222311 A1* 8/2014 Sasaki ..................... F02D 13/08
                                                     701/102
(Continued)

FOREIGN PATENT DOCUMENTS

EP   1505286 A2   2/2005
EP   1845248 A1  10/2007
(Continued)

*Primary Examiner* — Richard Camby
(74) *Attorney, Agent, or Firm* — Andrews Kurth Kenyon LLP

(57) ABSTRACT

A control apparatus of the invention is applied to a three-cylinder internal combustion engine that is mounted in a vehicle and in which a first MG is connected to a crankshaft in a manner capable of transmitting power. When stopping the internal combustion engine, a vehicle control unit controls output torque of the first MG such that the internal combustion engine is stopped in a state where a preset particular cylinder is in a compression stroke. The particular cylinder is a cylinder in which a mutually weakening relationship is established between a vibration component that is generated due to precession in the internal combustion engine when the internal combustion engine is started from the state where this particular cylinder is in the compression stroke and a vibration component that is predicted to be generated in the vehicle when it is assumed that torque to be applied to the crankshaft at a startup of the internal combustion engine is applied to the crankshaft in a state where a piston and a connecting rod of each cylinder are detached.

4 Claims, 13 Drawing Sheets

(51) Int. Cl.
*B60L 11/14* (2006.01)
*B60W 10/08* (2006.01)
*B60W 20/00* (2016.01)
*F02D 17/00* (2006.01)
*F02D 29/02* (2006.01)
*B60K 6/24* (2007.10)

(52) U.S. Cl.
CPC .............. *B60W 10/06* (2013.01); *B60W 10/08* (2013.01); *B60W 20/00* (2013.01); *B60W 20/40* (2013.01); *F02D 17/00* (2013.01); *F02D 29/02* (2013.01); *B60W 2510/06* (2013.01); *B60W 2510/0685* (2013.01); *B60W 2710/06* (2013.01); *B60W 2710/083* (2013.01); *B60Y 2300/45* (2013.01); *Y02T 10/6239* (2013.01); *Y02T 10/6286* (2013.01); *Y02T 10/6295* (2013.01); *Y02T 10/84* (2013.01); *Y10S 903/903* (2013.01)

(58) Field of Classification Search
USPC ......................................................... 701/22
See application file for complete search history.

(56) References Cited

U.S. PATENT DOCUMENTS

| 2014/0245984 A1* | 9/2014 | Seillier | F02N 15/025 |
| | | | 123/185.1 |
| 2014/0330476 A1 | 11/2014 | Tsukada | |
| 2015/0053174 A1* | 2/2015 | Nishimoto | F02D 13/0207 |
| | | | 123/346 |

FOREIGN PATENT DOCUMENTS

| EP | 2505407 A2 | 10/2012 |
| JP | 2005-016505 A | 1/2005 |
| JP | 2006-214332 A | 8/2006 |
| JP | 2007-276594 A | 10/2007 |
| JP | 2009-143377 A | 7/2009 |
| JP | 2010-043625 A | 2/2010 |
| WO | 2011065426 A1 | 6/2011 |
| WO | 2013088526 A1 | 6/2013 |

* cited by examiner

CONTROL APPARATUS FOR INTERNAL COMBUSTION ENGINE

CROSS-REFERENCE TO RELATED APPLICATIONS

This is a national phase application based on the PCT International Patent Application No. PCT/JP2014/064863 filed Jun. 4, 2014, claiming priority to Japanese Patent Application No. 2013-121022 filed Jun. 7, 2013, the entire contents of both of which are incorporated herein by reference.

TECHNICAL FIELD

The invention relates to a control apparatus that is applied to a three-cylinder internal combustion engine in which an electric motor is connected to a crankshaft in a manner capable of transmitting power.

BACKGROUND ART

A control apparatus that is applied to an internal combustion engine mounted in a hybrid vehicle and stops the internal combustion engine at a target stop crank angle by lowering a speed of the internal combustion engine by a motor generator when stopping the internal combustion engine has been known (see Patent Literature 1). Other than the above, Patent Literature 2 to 4 are available as related art literature that are related to the invention.

RELATED ART LITERATURE

Patent Literature

Patent Literature 1: Japanese Patent Application Publication No. 2009-143377 (JP 2009-143377 A)
Patent Literature 2: Japanese Patent Application Publication No. 2005-016505 (JP 2005-016505 A)
Patent Literature 3: Japanese Patent Application Publication No. 2010-043625 (JP 2010-043625 A)
Patent Literature 4: International Publication No. 2011/065426

SUMMARY OF THE INVENTION

Problem to be Solved by the Invention

In the apparatus of Patent Literature 1, an angle near the top dead center in a compression stroke is set as the target stop crank angle. However, such control that a preset particular cylinder is brought into the compression stroke upon stopping of the internal combustion engine is not executed. Accordingly, the cylinder that is brought into the compression stroke upon stopping of the internal combustion engine possibly differs each time. As described in Patent Literature 3, 4, precession is generated in a three-cylinder internal combustion engine, and this precession becomes a cause of a vibration at a startup. In addition, a phase of the precession varies in accordance with the cylinder that initially applies torque to the crankshaft at the startup. Thus, in the apparatus of Patent Literature 1, a large vibration is possibly generated at the startup.

In view of the above, an object of the invention is to provide a control apparatus for an internal combustion engine that can reduce a vibration at a startup.

Means for Solving the Problem

A control apparatus of the invention is applied to a three-cylinder internal combustion engine that is mounted in a vehicle and in which an electric motor is connected to a crankshaft in a manner capable of transmitting power. The control apparatus includes control means for controlling output torque of the electric motor at a time that the internal combustion engine is stopped such that the internal combustion engine is stopped in a state where a preset particular cylinder is in a compression stroke or an expansion stroke, and the particular cylinder is a cylinder in which a mutually weakening relationship is established between a vibration component generated due to precession of the internal combustion engine in the case where the internal combustion engine is started from the state where said particular cylinder is in the compression stroke or the expansion stroke and a vibration component predicted to be generated in the vehicle in the case where it is assumed that torque to be applied to the crankshaft at a startup of the internal combustion engine is applied to the crankshaft in a state where a piston and a connecting rod of each cylinder are detached.

In the control apparatus of the invention, the internal combustion engine is stopped such that the particular cylinder is brought into the compression stroke or the expansion stroke. Thus, cranking of the internal combustion engine in the state where this particular cylinder is in the compression stroke or the expansion stroke is performed at the next startup. In this case, the vibration component predicted to be generated by rotation of the crankshaft and the vibration component generated due to the precession weaken each other. Therefore, a vibration at the startup can be reduced.

In one aspect of the control apparatus of the invention, in the case where a specified engine stop condition is established and a crank angle of the internal combustion engine falls within a preset specified determination crank angle range, the control means may stop combustion of the internal combustion engine and then execute speed lowering control for lowering a rotational speed of the crankshaft by outputting torque from the electric motor, and a crank angle range in which the internal combustion engine is stopped in the state where the particular cylinder is in the compression stroke or the expansion stroke by starting the speed lowering control when the crank angle of the internal combustion engine falls within the determination crank angle range may be set as the determination crank angle range. By executing the speed lowering control, just as described, the internal combustion engine can be stopped in the state where the particular cylinder is in the compression stroke or the expansion stroke.

In this aspect, the vehicle may be provided with an operation switch through which a driver commands the vehicle to travel in a mode that prioritizes fuel economy. The control means may stop combustion of the internal combustion engine and then execute the speed lowering control in the case where the operation switch is OFF, the engine stop condition is established, and the crank angle of the internal combustion engine falls within the determination crank angle range, and may stop the combustion of the internal combustion engine and then execute the speed lowering control in the case where the operation switch is ON and the engine stop condition is established. In this aspect, in the case where the operation switch is ON and the engine stop condition is established, the combustion of the internal combustion engine is stopped even when the crank angle does not fall within the determination crank angle range. Therefore, fuel economy can be improved.

In one aspect of the control apparatus of the invention, in the case where the specified engine stop condition is established, the control means may stop combustion of the internal combustion engine and then execute speed control for lowering a rotational speed of the crankshaft by outputting torque from the electric motor, and a magnitude of the torque that is output from the electric motor in the speed control may be set such that the particular cylinder is brought into the state of the compression stroke or the expansion stroke when the internal combustion engine is stopped. By setting the magnitude of the torque that is output from the electric motor, just as described, the internal combustion engine can be stopped in the state where the particular cylinder is in the compression stroke or the expansion stroke.

MODES FOR CARRYING OUT THE INVENTION

First Embodiment

Figure 1:
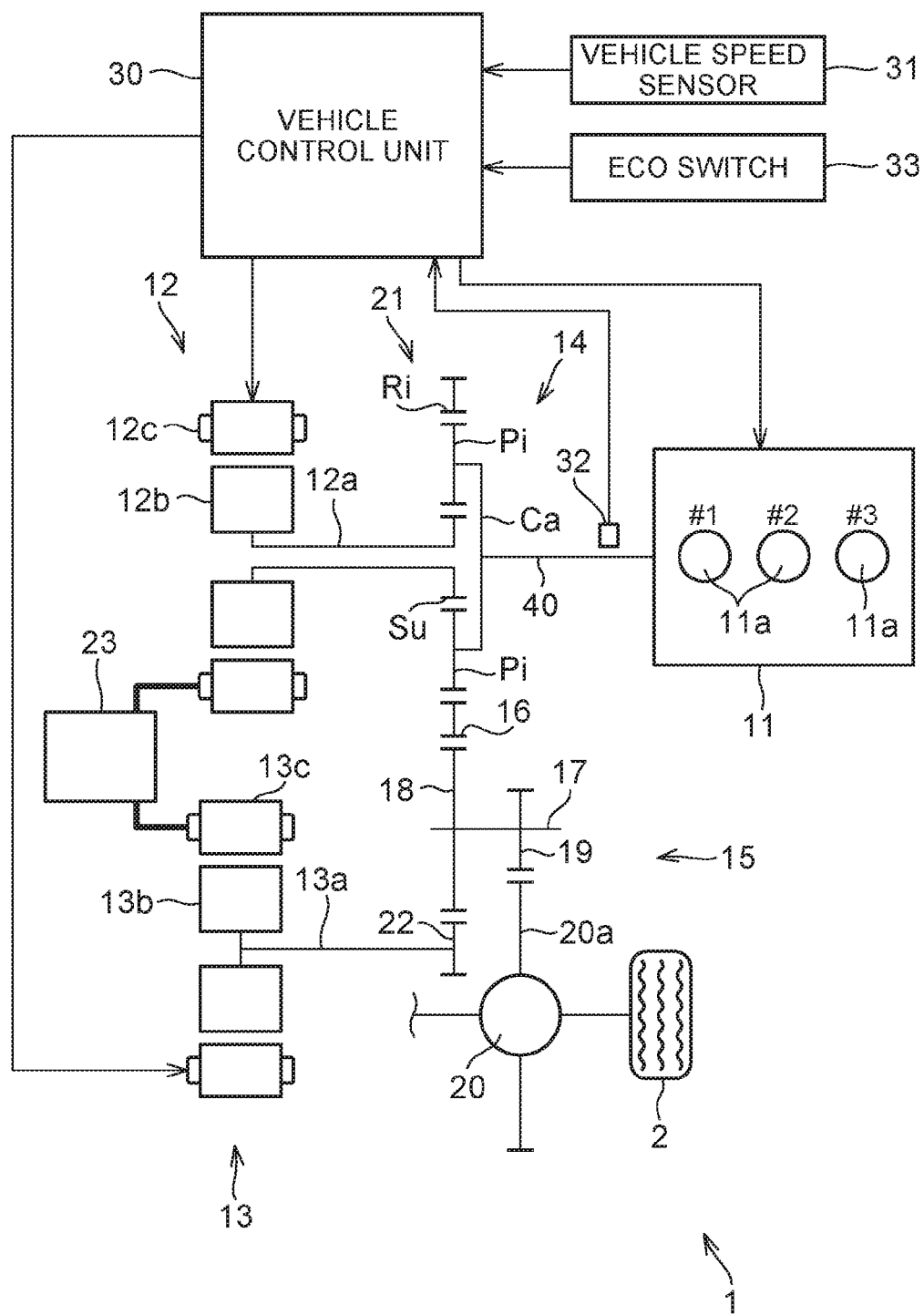
FIG. 1 is a view that schematically shows a hybrid vehicle in which an internal combustion engine, to which a control apparatus according to a first embodiment of the invention is applied, is mounted.

A description will hereinafter be made on an embodiment in which a control apparatus of the invention is applied to an internal combustion engine mounted in a hybrid vehicle. FIG. 1 schematically shows a hybrid vehicle 1. The vehicle 1 includes an internal combustion engine (hereinafter may be referred to as an engine) 11, a first motor generator (hereinafter may be abbreviated as a first MG) 12, and a second motor generator (hereinafter may be abbreviated as a second MG) 13. The engine 11 has three cylinders 11a that are aligned in line. That is, the engine 11 is constituted as an in-line three-cylinder four-stroke internal combustion engine. As shown in this drawing, the cylinders 11a are respectively denoted by cylinder numbers from #1 to #3 from one end to the other end side in an alignment direction thereof, so as to be distinguished from each other. In this engine 11, explosion intervals of the cylinders 11a are shifted by 240° C.A (means a crank angle), and thus explosions at equal intervals of every 240° C.A are realized. It should be noted that an explosion order in this engine 11 is in an order of #1, #2, #3.

The first MG 12 and the second MG 13 are well-known motor generators, each of which functions as an electric motor and a generator. The first MG 12 includes: a rotor 12b that integrally rotates with an output shaft 12a; and a stator 12c that is coaxially arranged on an outer circumference of the rotor 12b and is fixed to a case (not shown). Similarly, the second MG 13 includes: a rotor 13b that integrally rotates with an output shaft 13a; and a stator 13c that is coaxially arranged on an outer circumference of the rotor 13b and is fixed to a case.

A crankshaft 40 of the engine 11 and the output shaft 12a of the first MG 12 are connected to a power split mechanism 14. An output section 15 for transmitting power to drive wheels 2 of the vehicle 1 is also connected to the power split mechanism 14. The output section 15 includes: a first drive gear 16; a counter gear 18 that meshes with the first drive gear 16 and is fixed to a counter shaft 17; and an output gear 19 that is fixed to the counter shaft 17. The output gear 19 meshes with a ring gear 20a that is provided in a case of a differential mechanism 20. The differential mechanism 20 is a well-known mechanism that divides the power transmitted to the ring gear 20a to the right and left drive wheels 2. It should be noted that only one of the right and left drive wheels 2 is shown in FIG. 1.

The power split mechanism 14 includes a planetary gear mechanism 21 as a differential mechanism. The planetary gear mechanism 21 is a planetary gear mechanism of a single pinion type and includes a sun gear Su, a ring gear Ri, a pinion gear Pi, and a carrier Ca. The sun gear Su is an external gear. The ring gear Ri is an internal gear that is coaxially arranged with the sun gear Su. The pinion gear Pi meshes with both of the sun gear Su and the ring gear Ri. The carrier Ca holds the pinion gear Pi in a manner to allow rotation thereof and revolution thereof about the sun gear Su. The sun gear Su is coupled to the output shaft 12a of the first MG 12. The carrier Ca is coupled to the crankshaft 40 of the engine 11. The ring gear Ri is coupled to the first drive gear 16.

A second drive gear 22 is provided on the output shaft 13a of the second MG 13. The second drive gear 22 meshes with the counter gear 18. The first MG 12 and the second MG 13 are electrically connected to a battery 23 via an inverter and a boosting converter, which are not shown.

Operations of the engine 11, the first MG 12, and the second MG 13 are controlled by a vehicle control unit 30. The vehicle control unit 30 is constituted as a computer unit including a microprocessor and peripheral equipment, such as a RAM and a ROM, which are required for an operation thereof. The vehicle control unit 30 retains various control programs for making the vehicle 1 run appropriately. By executing these programs, the vehicle control unit 30 executes control of control targets such as the engine 11 and each of the MGs 12, 13. Various sensors for obtaining information related to the vehicle 1 are connected to the vehicle control unit 30. For example, a vehicle speed sensor 31 and a crank angle sensor 32 are connected to the vehicle control unit 30. The vehicle speed sensor 31 outputs a signal that corresponds to a speed of the vehicle 1 (a vehicle speed). The crank angle sensor 32 outputs a signal that corresponds to a crank angle of the engine 11. In addition, an ECO switch 33 is connected to the vehicle control unit 30. This ECO switch 33 is a switch that is used by a driver to command the vehicle control unit 30 to travel in a fuel economy mode that prioritizes fuel saving. An ON signal is output from the ECO switch 33 when the ECO switch 33 is ON, and an OFF signal is output therefrom when OFF. Although various sensors, switches, and the like are connected to the vehicle control unit 30 in addition to the above, those are not shown.

When a specified engine stop condition is established during the operation of the engine 11, the vehicle control unit 30 stops a fuel supply to the each cylinder 11a and stops the engine 11. In addition, when a specified engine startup condition is established during stopping of the engine 11, the vehicle control unit 30 performs cranking by using the first MG 12 so as to start the engine 11. In this vehicle 1, the vehicle 1 runs by using only the second MG 13 when the vehicle speed is lower than a preset specified determination speed. On the other hand, when the vehicle speed is the determination speed or higher, the vehicle 1 runs by using both of the engine 11 and the second MG 13. Thus, it is determined that the engine stop condition is established when the vehicle speed becomes lower than the determination speed, for example. In addition, it is determined that the engine startup condition is established when the vehicle speed becomes the determination speed or higher, for example.

When stopping the engine 11, the vehicle control unit 30 lowers a speed of the engine 11 by the first MG 12. In addition, at this time, the vehicle control unit 30 adjusts output torque of the first MG 12 such that the engine 11 is stopped in a state where a preset particular cylinder is in a compression stroke. By stopping the engine 11 just as described, the cylinder that is first brought into the compression stroke at the beginning of the startup can always be the same. Among the three cylinders 11a, the cylinder that can suppress a vibration during the cranking of the engine 11 is set as the particular cylinder.

Figure 2:
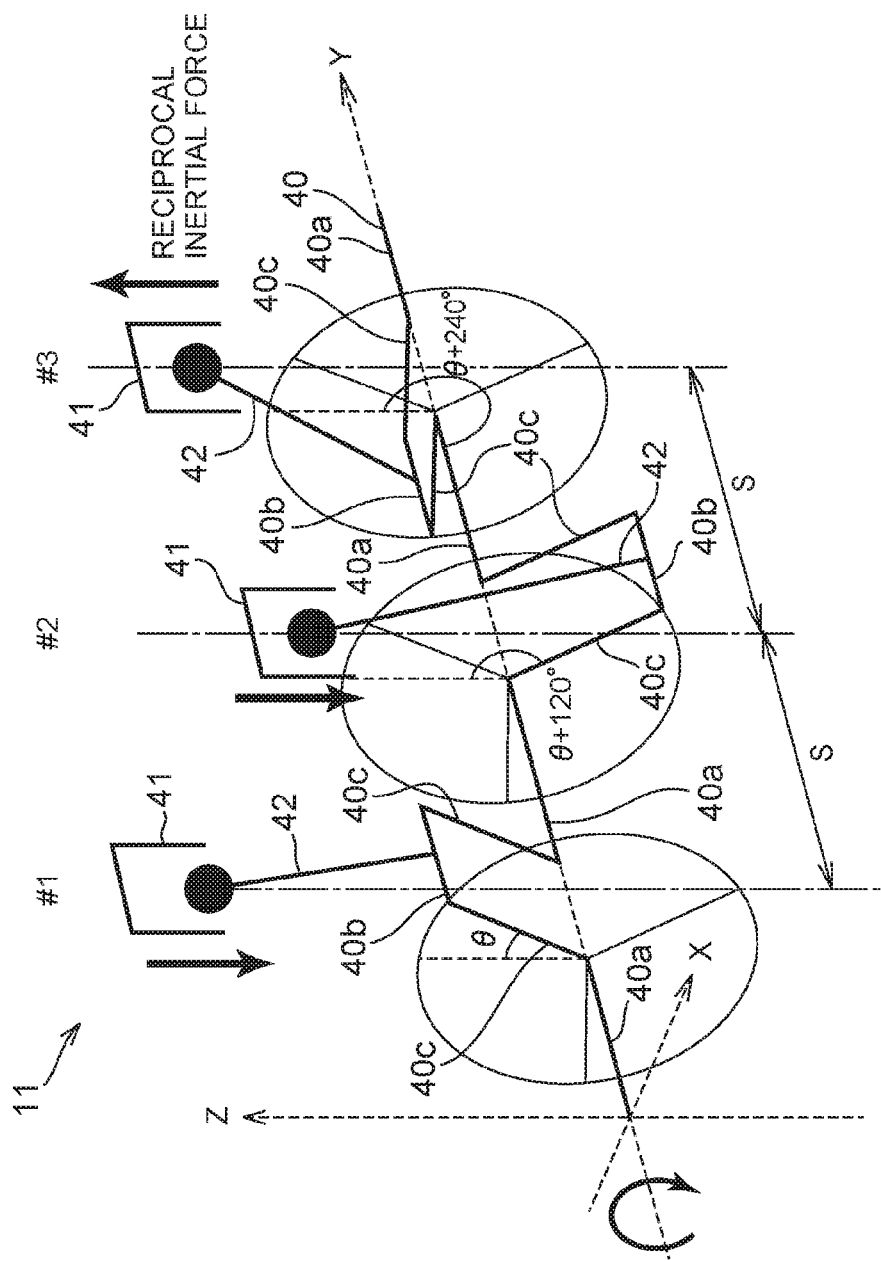
FIG. 2 is a view that schematically shows a crankshaft, pistons, and connecting rods of the engine.
Figure 3:
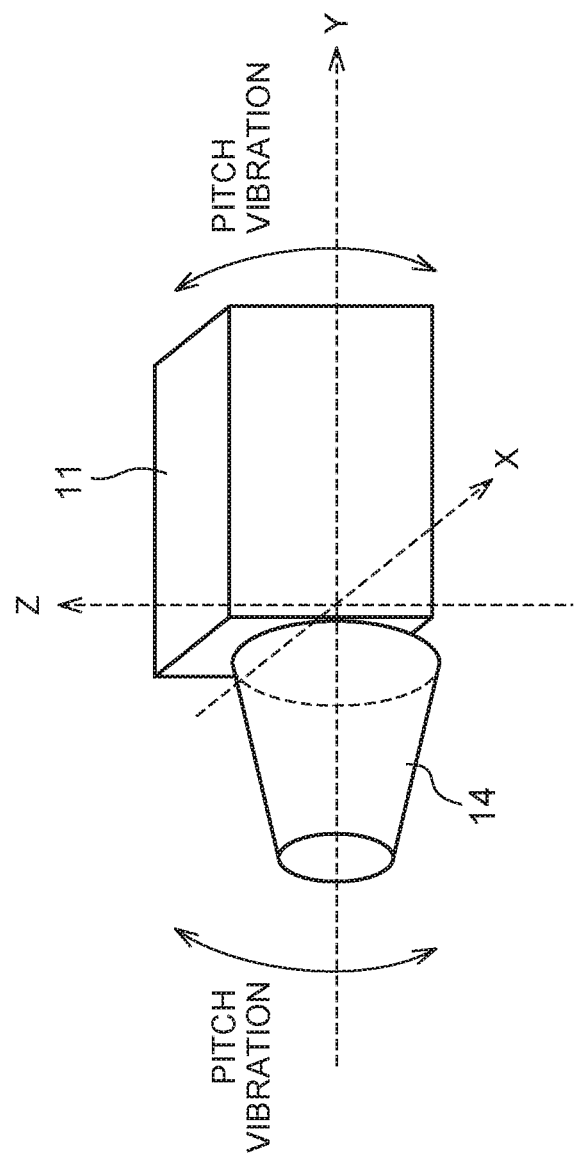
FIG. 3 is a view for explaining a pitch vibration that is generated in the engine.

A description will be made on this particular cylinder with reference to FIG. 2 to FIG. 8. FIG. 2 schematically shows the crankshaft 40, pistons 41, and connecting rods 42 of the engine 11. The piston 41 and the connecting rod 42 are provided for the each cylinder 11a. The piston 41 is inserted in the each cylinder 11a in a manner capable of reciprocating. The connecting rod 42 connects the piston 41 and the crankshaft 40. In the following description, a direction in a rotational axis of the crankshaft 40 is defined as a Y-axis. A direction in which the piston 41 reciprocates is defined as a Z-direction. A direction that crosses each of these Y-axis and Z-axis at a right angle is defined as an X-axis. As shown in FIG. 3, among vibrations that are generated in the engine 11, a vibration around the X-axis is a pitch vibration. In addition, a vibration around the Y-axis is a roll vibration, and a vibration around the Z-axis is a yaw vibration.

Figure 5:
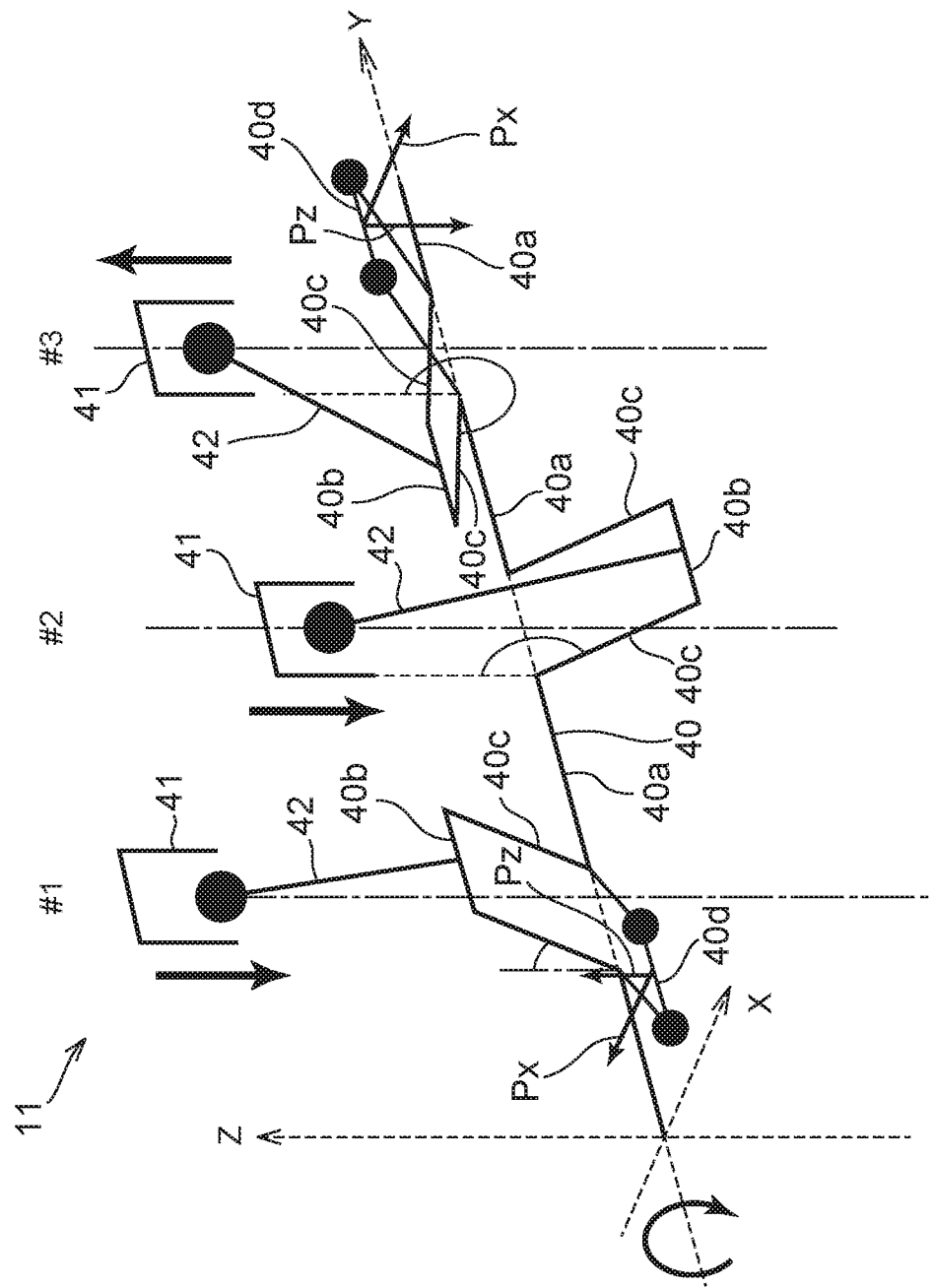
FIG. 5 is a view for explaining a force that is generated in a counter weight when the crankshaft rotates.

As shown in FIG. 2, the crankshaft 40 includes: four journal sections 40a that are aligned in the Y-axis direction; three crank pins 40b, each of which is positioned between the journal sections 40a; and crank arms 40c, each of which couples the journal section 40a and the crank pin 40b. In addition, as shown in FIG. 5, counter weights 40d are provided on the crankshaft 40. The each counter weight 40d extends to an opposite side of the crank pin 40b from the crank arm 40c. It should be noted that the counter weights 40d are not shown in FIG. 2. In addition, the counter weight 40d of the cylinder 11a of #2 is not shown in FIG. 5, either. These components of the crankshaft 40 are integrally formed by casting or the like. As shown in FIG. 2, the three crank pins 40b are provided to be shifted by 120 degrees around the Y-axis. The connecting rod 42 connects these crank pin 40b and piston 41.

As it has been well known, a vibration that is generated in the vehicle 1 during the cranking of the engine 11 includes plural vibration components. As the plural vibration components, a vibration component that is generated by rotation of the crankshaft 40 (hereinafter may be referred to as a crankshaft vibration component) and a vibration component that is generated by precession of the engine 11 (hereinafter may be referred to as a precession vibration component) are included.

Figure 8:
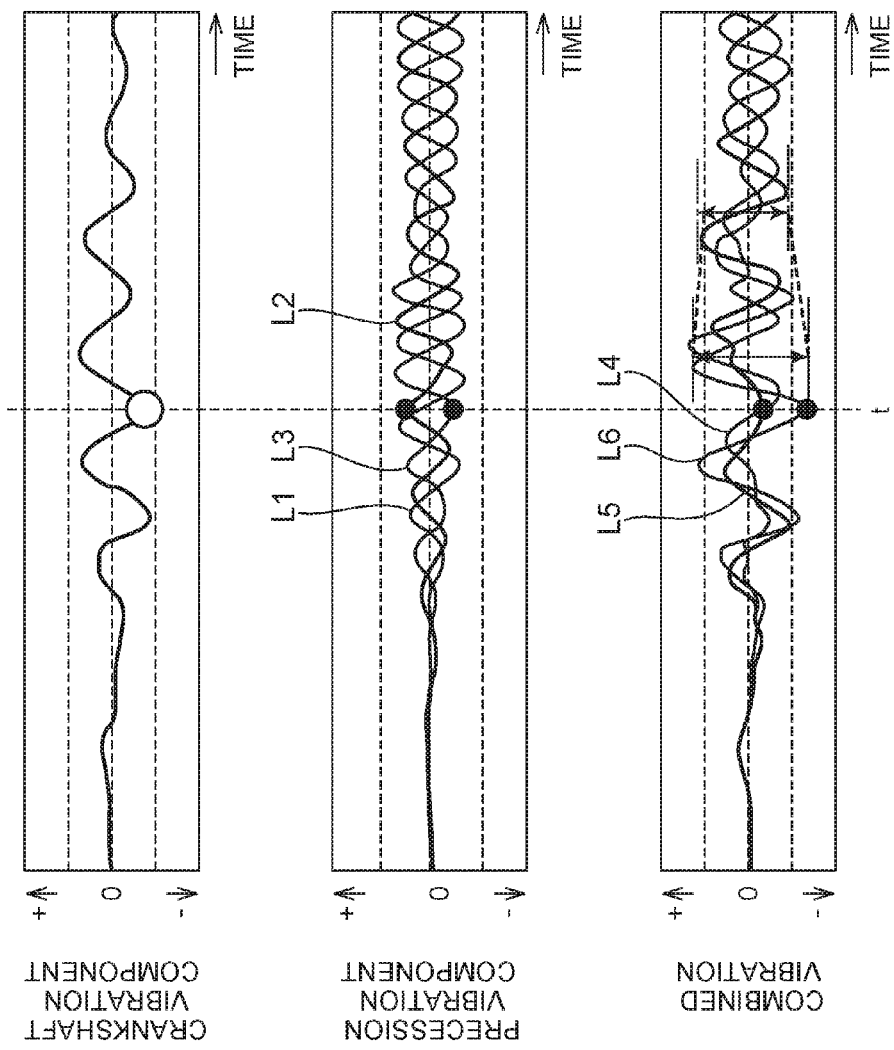
FIG. 8 includes charts of one example of temporal changes in a crankshaft vibration component, a precession vibration component, and a vibration in which those vibration components are combined.

First, the crankshaft vibration component will be described. As shown in FIG. 2, the each crank pin 40b is provided at a position that is separated from a rotational axis of the crankshaft 40 by a length of the crank arm 40c. In addition, the counter weights 40d are provided on the crankshaft 40. Then, as shown in this drawing, each set of these crank arms 40c and counter weights 40d is arranged to separate in the Y-axis direction by a distance S. Accordingly, when the crankshaft 40 is rotationally driven, these crank pins 40b and counter weights 40d rotate, and the vibration is thereby generated. The crankshaft vibration component corresponds to this vibration. It should be noted that the torque is input from the first MG 12 to the crankshaft 40 during the cranking. In addition, the torque is also applied to the crankshaft 40 from the cylinder in the compression stroke and the cylinder in an expansion stroke during the cranking. Thus, this crankshaft vibration component is a vibration that is predicted to be generated in the engine 11 when it is assumed that these types of the torque to be applied to the crankshaft 40 during the cranking of the engine 11 are applied to the crankshaft 40 in a state where the piston 41 and the connecting rod 42 of the each cylinder 11a are detached. A top chart in FIG. 8 shows one example of a temporal change in this crankshaft vibration component.

Figure 4:
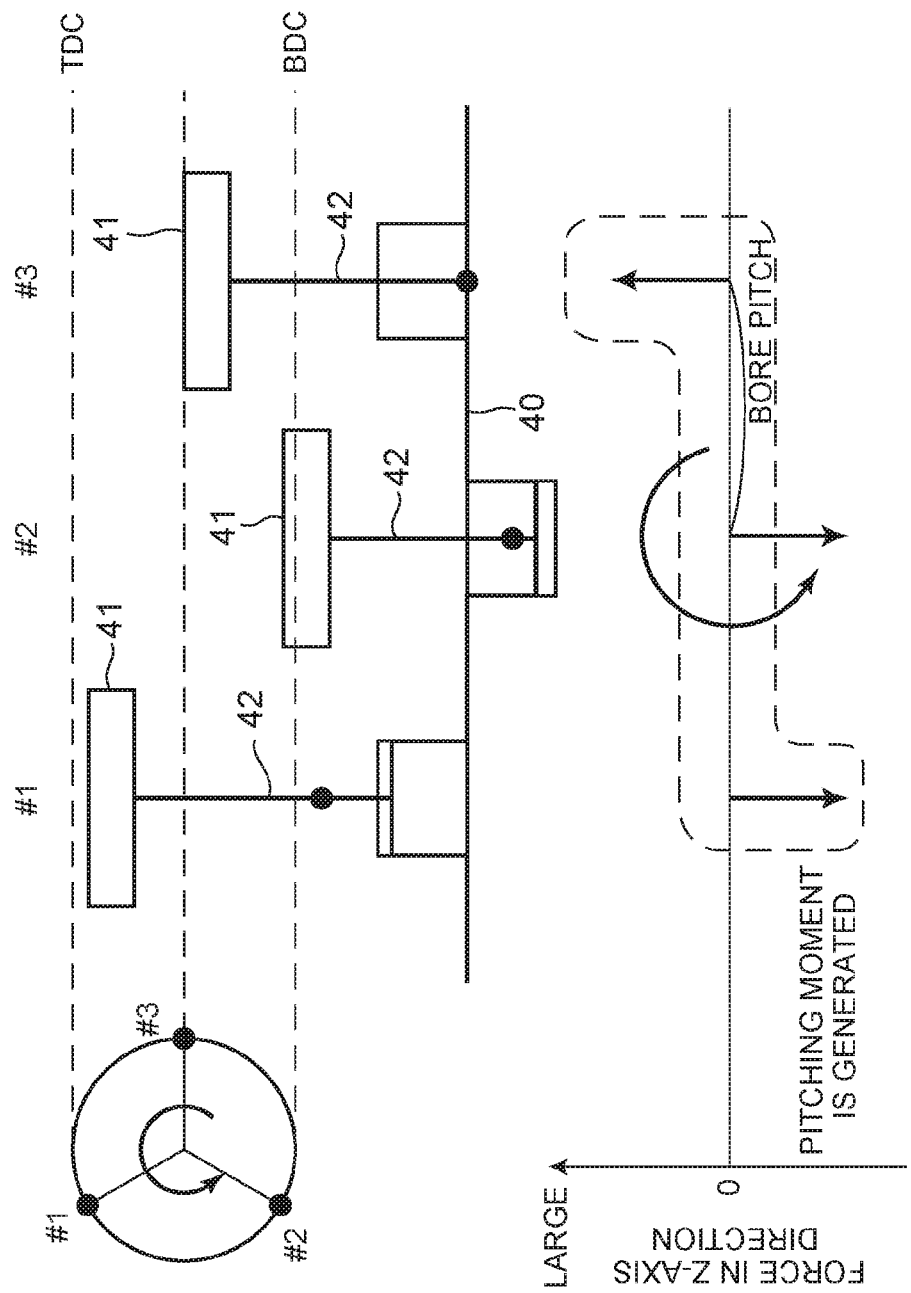
FIG. 4 is a view for explaining moment that is generated in the crankshaft.

Next, the precession vibration component will be described. First, the vibration of the engine 11 in a case without the counter weights 40d is considered. As described above, the each crank pin 40b is provided at the position that is separated from the rotational axis of the crankshaft 40 by the length of the crank arm 40c. Thus, when the crankshaft 40 is rotationally driven, an inertial force that is generated at a time that the piston 41 of the each cylinder 11a reciprocates and moment based on the length of the crank arm 40c are generated on the crankshaft 40. In addition, as shown in FIG. 2, the crank pins 40b are provided to be shifted by 120 degrees. Accordingly, as one example is shown in FIG. 4, a force in the Z-axis direction that is generated on the crankshaft 40 becomes unbalanced. In this way, as shown in FIG. 3, the pitch vibration is generated in the engine 11.

Figure 6:
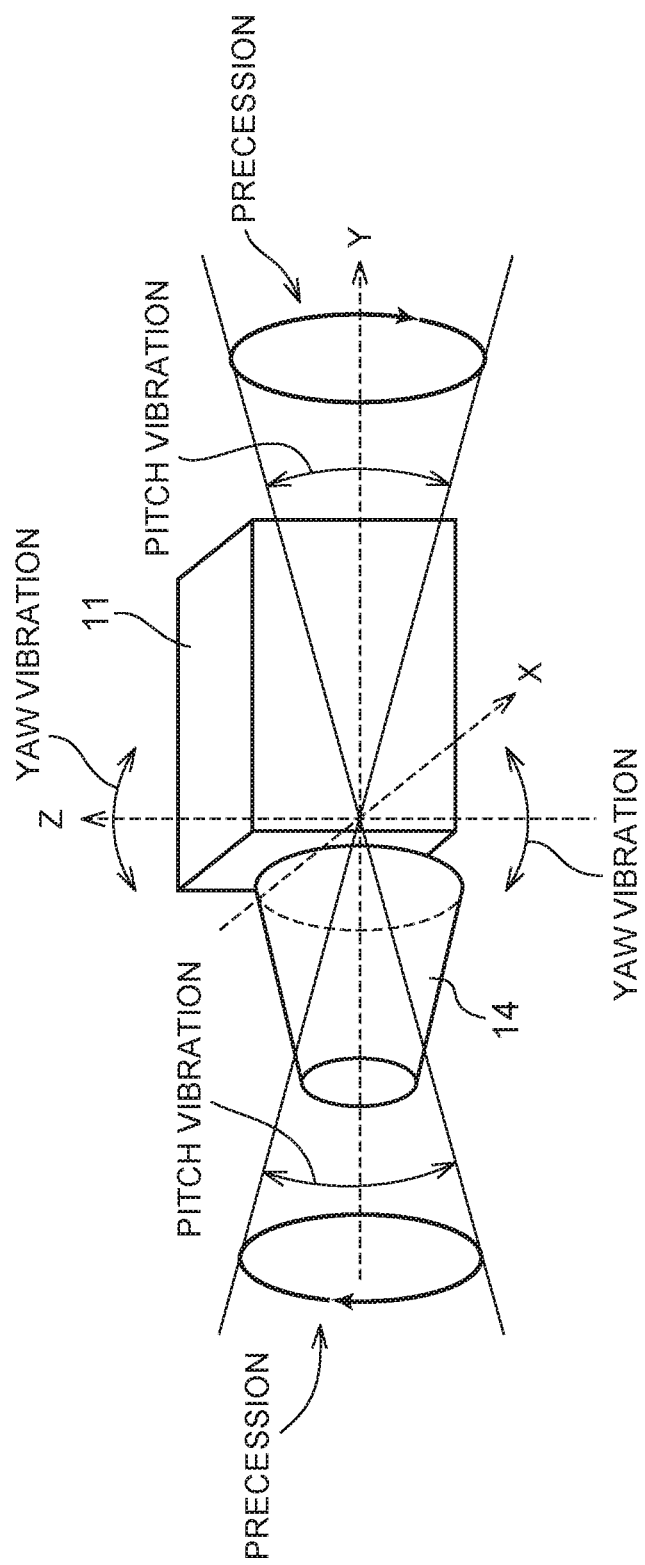
FIG. 6 is a view for explaining precession that is generated in the engine.

The counter weights 40d are provided to reduce the moment that is generated by such crank pins 40b as a cause. In this engine 11, a weight that includes a weight of the crank pin 40b, half a weight of the piston 41, and half a weight of the connecting rod 42 is set as a weight of the counter weight 40d. In other words, a so-called overbalance rate is set at 50% in the engine 11. In the case where such a counter weight 40d is present, as shown in FIG. 5, a force Px in the X-axis direction and a force Pz in the Z-axis direction are generated in the counter weight 40*d* when the crankshaft 40 rotates. This force Pz in the Z-axis direction reduces the above-described moment that is generated in the crank pin 40*b*. However, since the counter weight 40*d* is heavier than the crank pin 40*b*, the pitch vibration is generated in the engine 11. Meanwhile, the force Px in the X-axis direction becomes a force that vibrates the engine 11 in the X-axis direction. Then, as shown in this drawing, the force Px in the X-axis direction of the counter weight 40*d* in the cylinder 11*a* of #1 and the force Px in the X-axis direction of the counter weight 40*d* in the cylinder 11*a* of #3 act in opposite directions from each other. In this case, a couple of forces is generated in the X-axis direction, and the yaw vibration is generated in the engine 11. Then, when the pitch vibration and the yaw vibration are generated just as described, as shown in FIG. 6, the precession of the engine 11 is generated. The precession vibration component is a vibration that is caused by this precession of the engine 11.

Figure 7:
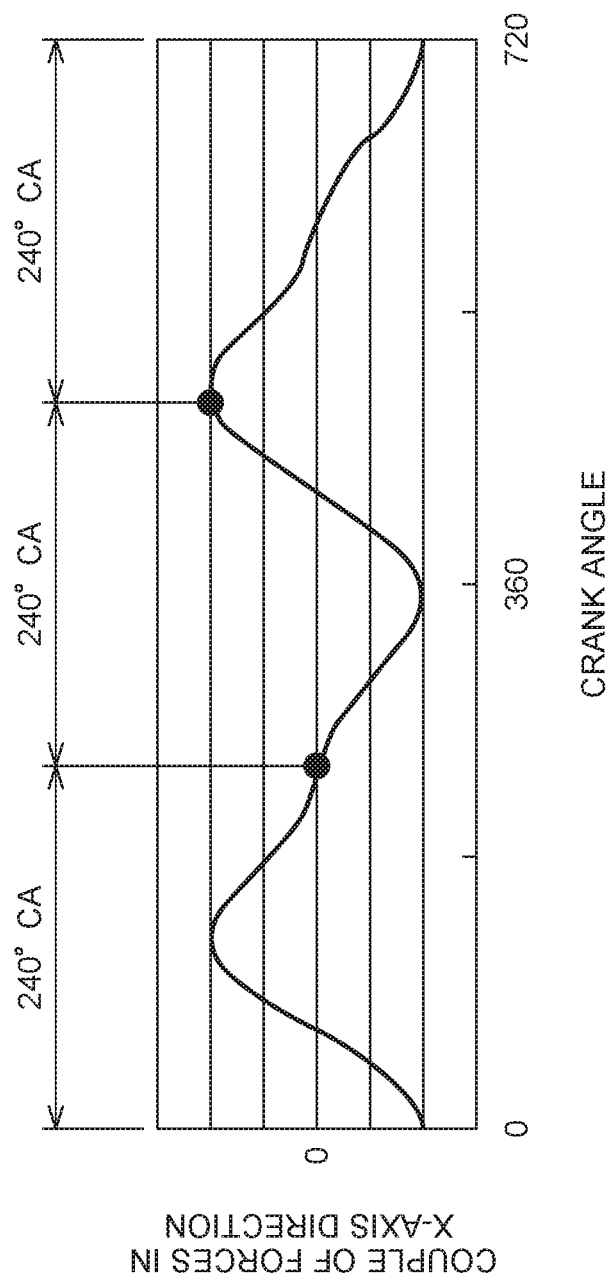
FIG. 7 is a chart that shows a relationship between a couple of forces in an x-axis direction that is generated in the engine and a crank angle.

FIG. 7 shows a relationship between the couple of forces in the X-axis direction that is generated in the engine 11 and the crank angle. As shown in this chart, the couple of forces in the X-axis direction varies at a 360° C.A interval. Meanwhile, in the engine 11, the compression strokes of the cylinders 11*a* are shifted by 240° C.A. Accordingly, a phase of the couple of forces in the X-axis direction varies in accordance with which cylinder of the three cylinders 11*a* is first brought into the compression stroke at the startup of the engine 11. A middle chart in FIG. 8 shows one example of a temporal change in the precession vibration component. A solid line L1 in this chart indicates a temporal change in the precession vibration component in the case where the cylinder 11*a* of #1 is first brought into the compression stroke at the startup. A solid line L2 in this chart indicates a temporal change in the precession vibration component in the case where the cylinder 11*a* of #2 is first brought into the compression stroke at the startup. A solid line L3 in this chart indicates a temporal change in the precession vibration component in the case where the cylinder 11*a* of #3 is first brought into the compression stroke at the startup. A bottom chart in FIG. 8 shows a vibration in which the crankshaft vibration component and the precession vibration component are combined. It should be noted that a solid line L4 in this chart indicates a vibration in which the crankshaft vibration component and the precession vibration component in the case where the cylinder 11*a* of #1 is first brought into the compression stroke at the startup are combined. A solid line L5 in this chart indicates a vibration in which the crankshaft vibration component and the precession vibration component in the case where the cylinder 11*a* of #2 is first brought into the compression stroke at the startup are combined. A solid line L6 in this chart indicates a vibration in which the crankshaft vibration component and the precession vibration component in the case where the cylinder 11*a* of #3 is first brought into the compression stroke at the startup are combined.

As shown at time t in FIG. 8, the phase of the precession vibration component in the case where the cylinder 11*a* of #2 is first brought into the compression stroke at the startup is substantially opposite of a phase of the crankshaft vibration component. Thus, as shown in the bottom chart in FIG. 8, the vibration in which the precession vibration component in the case where the cylinder 11*a* of #2 is first brought into the compression stroke at the startup and the crankshaft vibration component are combined becomes the smallest. Accordingly, in the engine 11, the cylinder 11*a* of #2 is set as the particular cylinder. It should be noted that, as shown in this chart, the phase of the precession vibration component in the case where the cylinder 11*a* of #3 is first brought into the compression stroke at the startup is substantially the same as the phase of the crankshaft vibration component in the engine 11. Thus, the vibration of the vehicle 1 is increased in this case.

Returning to FIG. 1, the description will continue on the control of the engine 11 by the vehicle control unit 30. As described above, when stopping the engine 11, the vehicle control unit 30 lowers the speed of the engine 11 by the first MG 12. At this time, the vehicle control unit 30 changes the control of the first MG 12 in accordance with the speed of the engine 11. As the control of this first MG 12, speed lowering control, positioning control, torque releasing control, and reverse rotation preventing control are provided. These types of the control are executed in an order of the speed lowering control, the positioning control, the torque releasing control, and the reverse rotation preventing control.

The speed lowering control is executed when the crank angle falls within a preset specified determination crank angle range. As the specified determination crank angle range, a crank angle range in which the engine 11 is stopped in a state where the cylinder 11*a* of #2 is in the compression stroke when each of the above-described control is executed from this crank angle range is set. It should be noted that such a crank angle range may be computed in advance by an experiment, a numerical calculation, or the like and be stored in the ROM of the vehicle control unit 30. In addition, this speed lowering control is executed until the speed of the engine 11 becomes a preset specified first determination speed N1 or lower. This first determination speed N1 is a speed at which the positioning control is started. When the speed of the engine 11 becomes the first determination speed N1 or lower, the positioning control is started. In this positioning control, the torque is output from the first MG 12 such that the crankshaft 40 has a preset specified target crank angle when the engine 11 is stopped. It should be noted that the crank angle at which the cylinder 11*a* of #2 is positioned near the top dead center in the compression stroke when the engine 11 is stopped is set as this target crank angle, for example.

The positioning control is executed until the speed of the engine 11 becomes a preset specified second determination speed N2 or lower. This second determination speed N2 is a speed at which the torque releasing control is started. When the speed of the engine 11 becomes the second determination speed N2 or lower, the torque releasing control is started. In this torque releasing control, the torque of the first MG 12 is reduced to zero. The torque releasing control is executed until the speed of the engine 11 becomes a third determination speed N3 or lower. This third determination speed N3 is a speed at which the reverse rotation preventing control is started. It should be noted that magnitude relationships among the first determination speed N1, the second determination speed N2, and the third determination speed N3 are N3<N2<N1<an idle speed.

When the speed of the engine 11 becomes the third determination speed N3 or lower, the reverse rotation preventing control is executed. In this reverse rotation preventing control, the torque is output from the first MG 12 such that the crankshaft 40 does not rotate in a reverse rotational direction that is opposite of a normal rotational direction in which the crankshaft 40 rotates during the operation of the engine 11 and that the crankshaft 40 is stopped at the target crank angle. This reverse rotation preventing control is executed until the engine 11 stops. When the engine 11 stops, the first MG 12 also stops.

Figure 9:
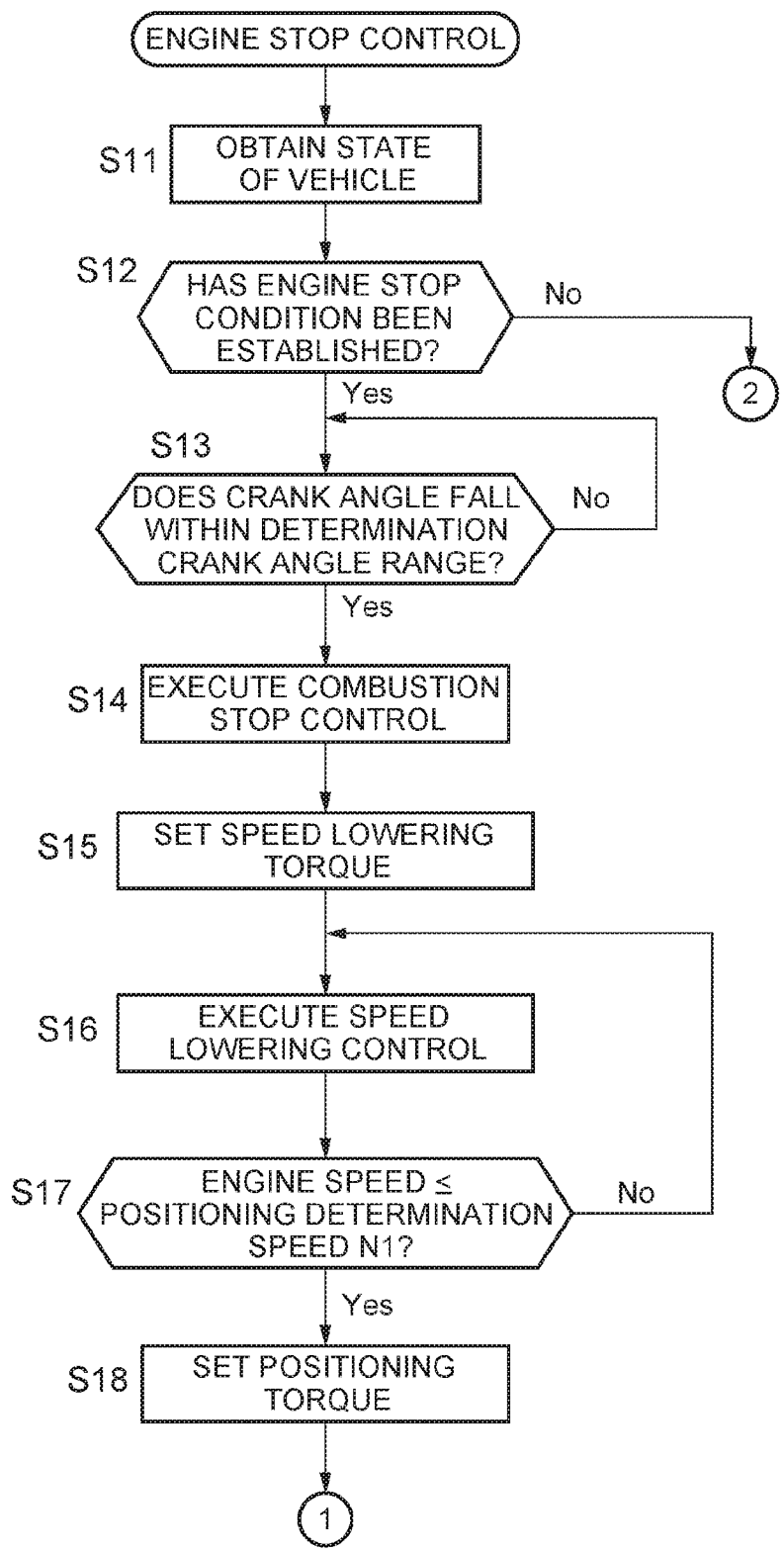
FIG. 9 is a flowchart of an engine stop control routine that is executed by a vehicle control unit.
Figure 10:
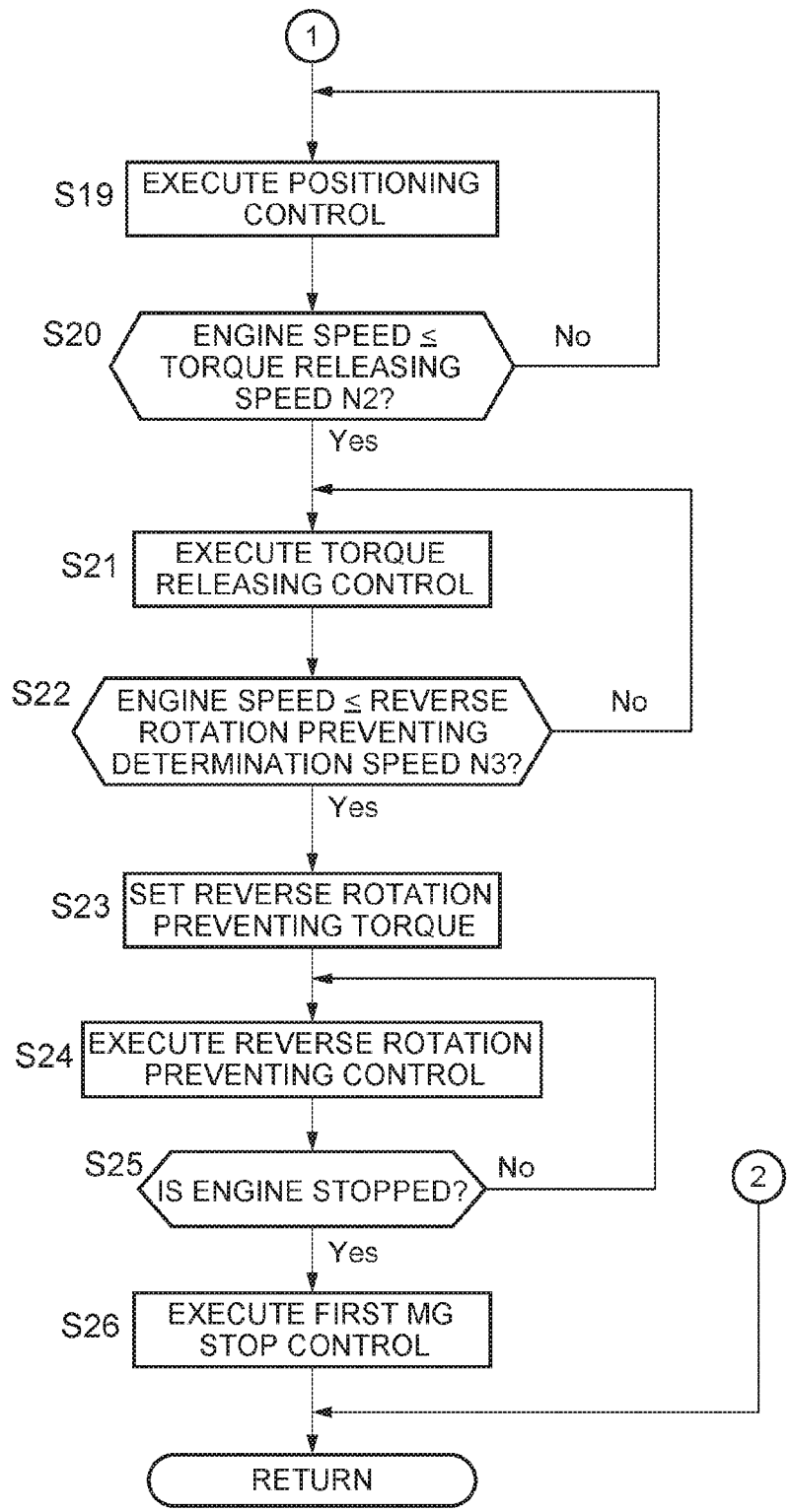
FIG. 10 is a flowchart that continues from FIG. 9.

FIG. 9 and FIG. 10 show an engine stop control routine that is executed so as for the vehicle control unit 30 to control the first MG 11 as shown in the drawings. It should be noted that FIG. 10 shows a control routine that follows FIG. 9. This control routine is repeatedly executed at specified intervals during the operation of the engine 11. In addition, this control routine is executed in parallel with another control routine executed by the vehicle control unit 30. By executing this control routine, the vehicle control unit 30 functions as control means of the invention.

In this control routine, the vehicle control unit 30 first obtains a state of the vehicle 1 in step S11. The vehicle speed and the crank angle are obtained as the state of the vehicle 1. In addition, in this process, the speed of the engine 11 and the cylinder number of the cylinder 11a that is currently in the compression stroke are also obtained on the basis of the output signal of the crank angle sensor 32. It should be noted that, when any cylinder 11a of the three cylinders 11a is not in the compression stroke, the cylinder number of the cylinder 11a that was previously in the compression stroke is obtained. In next step S12, the vehicle control unit 30 determines whether the above-described engine stop condition is established. If it is determined that the engine stop condition is not established, the current control routine is terminated.

On the other hand, if it is determined that the engine stop condition has been established, the process proceeds to step S13, and it is determined whether the crank angle falls within the above-described specified determination crank angle range. If it is determined that the crank angle does not fall within the determination crank angle range, this process is repeatedly executed until the crank angle falls within the determination crank angle range. On the other hand, if it is determined that the crank angle falls within the determination crank angle range, the process proceeds to step S14, and the vehicle control unit 30 executes combustion stop control. In this combustion stop control, the fuel supply to the engine 11 is stopped, and the combustion of the engine 11 is stopped. In next step S15, the vehicle control unit 30 sets speed lowering torque on the basis of the speed of the engine 11 at a time that the combustion is stopped. This speed lowering torque is torque that is output from the first MG 12 in order to promptly lower the speed of the engine 11. As the speed of the engine 11 at the time that the combustion is stopped is high, the torque that is required to lower the speed of the engine 11 is increased. Thus, as the speed of the engine 11 at the time that the combustion of the engine 11 is stopped is high, a larger value is set for the speed lowering torque. It should be noted that this relationship may be computed in advance by an experiment, a numerical calculation, or the like and be stored as a map in the ROM of the vehicle control unit 30. Then, the speed lowering torque may be set on the basis of this map and the speed of the engine 11.

In next step S16, the vehicle control unit 30 executes the speed lowering control. In this speed lowering control, the set speed lowering torque is output from the first MG 12, so as to lower the speed of the engine 11. In next step S17, the vehicle control unit 30 determines whether the speed of the engine 11 has become the first determination speed N1 or lower. If it is determined that the speed of the engine 11 is higher than the first determination speed N1, the process returns to step S16, and the vehicle control unit 30 repeatedly executes steps S16 and S17 until the speed of the engine 11 becomes the first determination speed N1 or lower.

On the other hand, if it is determined that the speed of the engine 11 has become the first determination speed N1 or lower, the process proceeds to step S18, and the vehicle control unit 30 sets positioning torque on the basis of the crank angle at which it is determined that the speed of the engine 11 has become the first determination speed N1 or lower (hereinafter may be referred to as a first crank angle). This positioning torque is torque that is output from the first MG 12 such that the crankshaft 40 becomes the above-described target crank angle when the engine 11 becomes the specified speed or lower. It is assumed that the speed lowering torque is continuously output from the first MG 12 until the speed of the engine 11 changes from the first determination speed N1 to the second determination speed N2. At the first crank angle, the crank angle during stopping of the engine 11 becomes the target crank angle in this case, and the first crank angle is computed in accordance with the target crank angle and specifications of the engine 11. Hereinafter, such a first crank angle may be referred to as a first reference crank angle. In addition, in order to set the crank angle during stopping of the engine 11 to the target crank angle, the torque output from the first MG 12 needs to be increased as a difference between the first crank angle and the first reference crank angle is increased. Accordingly, a larger value is set for the positioning torque as the difference between the first crank angle and the first reference crank angle is increased. This relationship between the difference between the first crank angle and the first reference crank angle and the positioning torque may be computed in advance by an experiment, a numerical calculation, or the like and be stored as a map in the ROM of the vehicle control unit 30. Then, the positioning torque may be set on the basis of this map and the first crank angle.

Next, in step S19 of FIG. 10, the vehicle control unit 30 executes the positioning control. In this positioning control, the torque that is a sum of the speed lowering torque and the positioning torque is output from the first MG 12. In following step S20, the vehicle control unit 30 determines whether the speed of the engine 11 has become the second determination speed N2 or lower. If it is determined that the speed of the engine 11 is higher than the second determination speed N2, the process returns to step S19, and the vehicle control unit 30 repeatedly executes steps S19 and S20 until the speed of the engine 11 becomes the second determination speed N2 or lower.

On the other hand, if it is determined that the speed of the engine 11 has become the second determination speed N2 or lower, the process proceeds to step S21, and the vehicle control unit 30 executes the torque releasing control. In this torque releasing control, the first MG 12 is controlled such that the torque of the first MG 12 is reduced at a preset torque releasing rate. It should be noted that the torque releasing rate may be set appropriately such that the torque of the first MG 12 is not abruptly reduced. In following step S22, the vehicle control unit 30 determines whether the speed of the engine 11 has become the third determination speed N3 or lower. If it is determined that the speed of the engine 11 is higher than the third determination speed N3, the process returns to step S21, and the vehicle control unit 30 repeatedly executes steps S21 and S22 until the speed of the engine 11 becomes the third determination speed N3 or lower.

On the other hand, if it is determined that the speed of the engine 11 has become the third determination speed N3 or lower, the process proceeds to step S23, and the vehicle control unit 30 sets reverse rotation preventing torque on the basis of the crank angle at which the torque of the first MG 12 becomes zero (hereinafter may be referred to as a second crank angle). This reverse rotation preventing torque is torque that is output from the first MG 12 such that rotation of the crankshaft 40 in the reverse rotational direction is prevented and the crankshaft 40 is stopped at the target crank angle. It is assumed that the output torque of the first MG 12 is set to zero until the speed of the engine 11 changes from the third determination speed N3 to zero. At the second crank angle, the crank angle during stopping of the engine 11 becomes the target crank angle in this case, and the second crank angle is computed in accordance with the target crank angle and the specifications of the engine 11. Hereinafter, such a second crank angle may be referred to as a second reference crank angle. In addition, in order to set the crank angle during stopping of the engine 11 to the target crank angle, the torque output from the first MG 12 needs to be increased as a difference between the second crank angle and the second reference crank angle is increased. Accordingly, a larger value is set for the reverse rotation preventing torque as the difference between the second crank angle and the second reference crank angle is increased. This relationship between the difference between the second crank angle and the second reference crank angle and the reverse rotation preventing torque may be computed in advance by an experiment, a numerical calculation, or the like and be stored as a map in the ROM of the vehicle control unit 30. Then, the reverse rotation preventing torque may be set on the basis of this map and the second crank angle.

In next step S24, the vehicle control unit 30 executes the reverse rotation preventing control. In this reverse rotation preventing control, the set reverse rotation preventing torque is output from the first MG 12. In following step S25, the vehicle control unit 30 determines whether the engine 11 has been stopped, that is, whether the speed of the engine 11 has become zero. If it is determined that the engine 11 has not been stopped, the process returns to step S24, and the vehicle control unit 30 repeatedly executes steps S24 and S25 until the engine 11 stops.

On the other hand, if it is determined that the engine 11 has been stopped, the process proceeds to step S26, and the vehicle control unit 30 executes first MG stop control. In this first MG stop control, the output torque of the first MG 12 is set to zero so as to stop the first MG 12. Thereafter, the current control routine is terminated.

Figure 11:
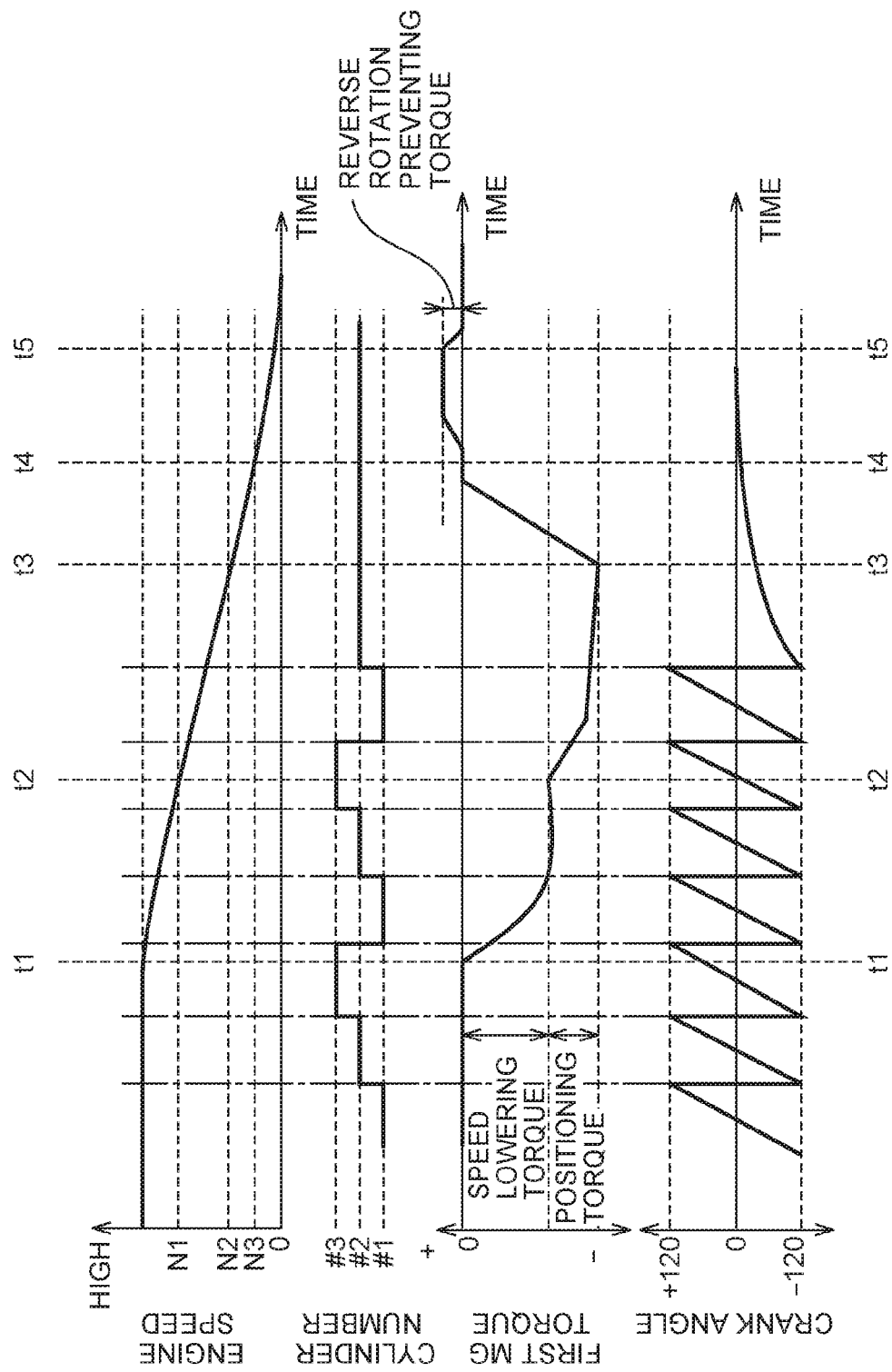
FIG. 11 is a chart of one example of temporal changes in an engine speed, cylinder numbers of a cylinder that is currently in a compression stroke and a cylinder that was previously in the compression stroke, torque of a first MG and the crank angle at a time that the engine stop control routine is executed to stop the engine.

FIG. 11 shows one example of temporal changes in the speed of the engine 11, the cylinder number of the cylinder 11a that is currently in the compression stroke or the cylinder 11a that was previously in the compression stroke, the torque of the first MG 12, and the crank angle at a time that this engine stop control routine is executed to stop the engine 11. It should be noted that, in this chart, the torque output from the first MG 12 when the first MG12 rotates in the normal rotation direction is indicated as positive torque, and the torque output from the first MG 12 when the first MG 12 rotates in the reverse rotational direction is indicated as negative torque.

In the example shown in this chart, the engine stop condition is established at time t1, and the speed lowering control is executed. In this way, the speed lowering torque is output from the first MG 12, and the speed of the engine 11 is thereby lowered. Then, when the speed of the engine 11 is lowered to the first determination speed N1 at time t2, the positioning control is executed.

When the speed of the engine 11 is lowered to the second determination speed N2 at time t3, the torque releasing control is executed. Thereafter, when the speed of the engine 11 is lowered to the third determination speed N3 at time t4, the reverse rotation preventing control is executed. Then, when the engine 11 is stopped at time t5, the first MG stop control is executed, and the first MG 12 is stopped. In addition, at this time, the cylinder 11a of #2 is in the state of the compression stoke.

As it has been described so far, in the first embodiment, the cylinder 11a of #2 is in the compression stroke when the engine 11 is stopped. Thus, this cylinder 11a of #2 is always brought into the compression stroke first at every startup. In addition, as shown in FIG. 8, the precession vibration component in the case where the cylinder 11a of #2 is in the compression stroke at the startup has a substantially opposite phase of the crankshaft vibration component. In this case, since these vibration components weaken each other, the vibration of the vehicle 1 at the startup can be reduced.

It should be noted that the cylinder 11a of #2 is set as the particular cylinder in the above-described embodiment; however, the particular cylinder is not limited to this cylinder. Among the three cylinders 11a, the cylinder 11a, in which the precession vibration component has the substantially opposite phase of the crankshaft vibration component at the startup, is set as the particular cylinder. Such a cylinder 11a is changed by the specifications of the engine 11, specifications of the power split mechanism 14, or the like. Thus, such a cylinder 11a may be identified by an experiment, a numerical calculation, or the like, and the cylinder 11a may be set as the particular cylinder.

In addition, in the above-described embodiment, the particular cylinder is brought into the state of the compression stroke when the engine 11 is stopped. However, the state of the particular cylinder when the engine 11 is stopped is not limited to this state. For example, an internal combustion engine in which fuel is enclosed in the cylinder 11a that is brought into the expansion stroke when the engine 11 is stopped and the fuel is ignited at a next startup to start the engine 11 has been known. In such an internal combustion engine, the engine 11 may be stopped in the state where the particular cylinder is in the expansion stroke.

It should be noted that the first MG 12 corresponds to the electric motor of the invention. The ECO switch 33 corresponds to an operation switch of the invention. The speed lowering control and the positioning control correspond to the speed lowering control of the invention.

Second Embodiment

Next, a description will be made on a control apparatus according to a second embodiment of the invention with reference to FIG. 12. It should be noted that FIG. 1 is also referred for the vehicle 1 in this embodiment. Thus, the common components with the first embodiment are denoted by the same reference numerals and the description thereon will not be made.

Figure 12:
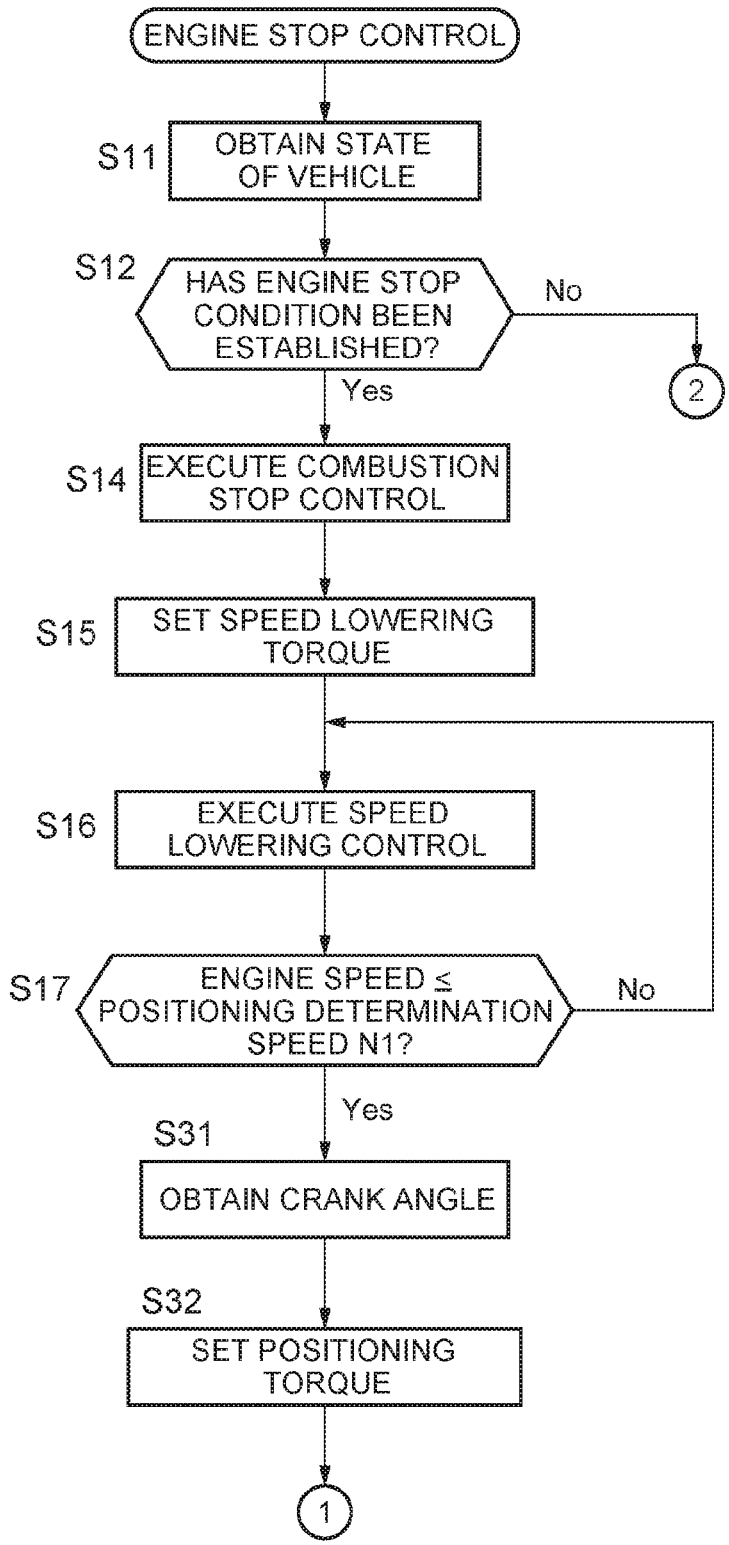
FIG. 12 is a flowchart of a part of an engine stop control routine that is executed by a vehicle control unit in a control apparatus according to a second embodiment of the invention.

FIG. 12 shows a part of the engine stop control routine that is executed by the vehicle control unit 30 in this embodiment. It should be noted that FIG. 12 is used instead of the part in FIG. 9 in the first embodiment. Thus, a part after FIG. 12, that is, the part in FIG. 10 is the same as the first embodiment also in the engine stop control routine of this embodiment.

Also in the engine stop control routine in this embodiment, the process proceeds in the similar manner to the first embodiment until step S12. If it is determined in step S12 that the engine stop condition has been established, the process proceeds to step S14, and the process proceeds onward in the similar manner to the first embodiment until step S17. Then, if it is determined in step S17 that the speed of the engine 11 has become the first determination speed N1 or lower, the process proceeds to step S31, and the vehicle control unit 30 obtains the current crank angle, that is, the first crank angle. In following step S32, the vehicle control unit 30 sets the positioning torque on the basis of the first crank angle. In this embodiment, the positioning torque is set such that the cylinder 11a of #2 is brought into the compression stroke when the engine 11 is stopped. More specifically, crank angle displacement is first calculated from a difference between the first crank angle and the preset target crank angle. As described above, the crank angle at which the cylinder 11a of #2 is positioned near the top dead center in the compression stroke when the engine 11 is stopped is set as this target crank angle, for example. Accordingly, the crank angle displacement is an angle for which the crankshaft 40 rotates from present time until the engine 11 is stopped. In addition, the positioning torque is calculated on the basis of this crank angle displacement. A relationship between the positioning torque and the crank angle displacement may be computed in advance by an experiment, a numerical calculation, or the like and be stored as a map in the ROM of the vehicle control unit 30. Then, the positioning torque may be computed on the basis of this map.

After the positioning torque is set, the process proceeds to step S19, and the process proceeds onward in the similar manner to the first embodiment.

As it has been described so far, in this embodiment, the positioning torque is set such that the cylinder 11a of #2 is brought into the compression stroke when the engine 11 is stopped, and the positioning control is executed by using this positioning torque. Accordingly, the cylinder 11a of #2 can be brought into the compression stroke when the engine 11 is stopped. In this way, since the cylinder 11a of #2 is first brought into the compression stroke at the startup, the precession vibration component and the crankshaft vibration component can have the substantially opposite phases. Therefore, the vibration of the vehicle 1 at the startup can be reduced.

Third Embodiment

A description will be made on a control apparatus according to a third embodiment of the invention with reference to FIG. 13. It should be noted that FIG. 1 is also referred for the vehicle 1 in this embodiment. Thus, the common components with the first embodiment are denoted by the same reference numerals and the description thereon will not be made.

Figure 13:
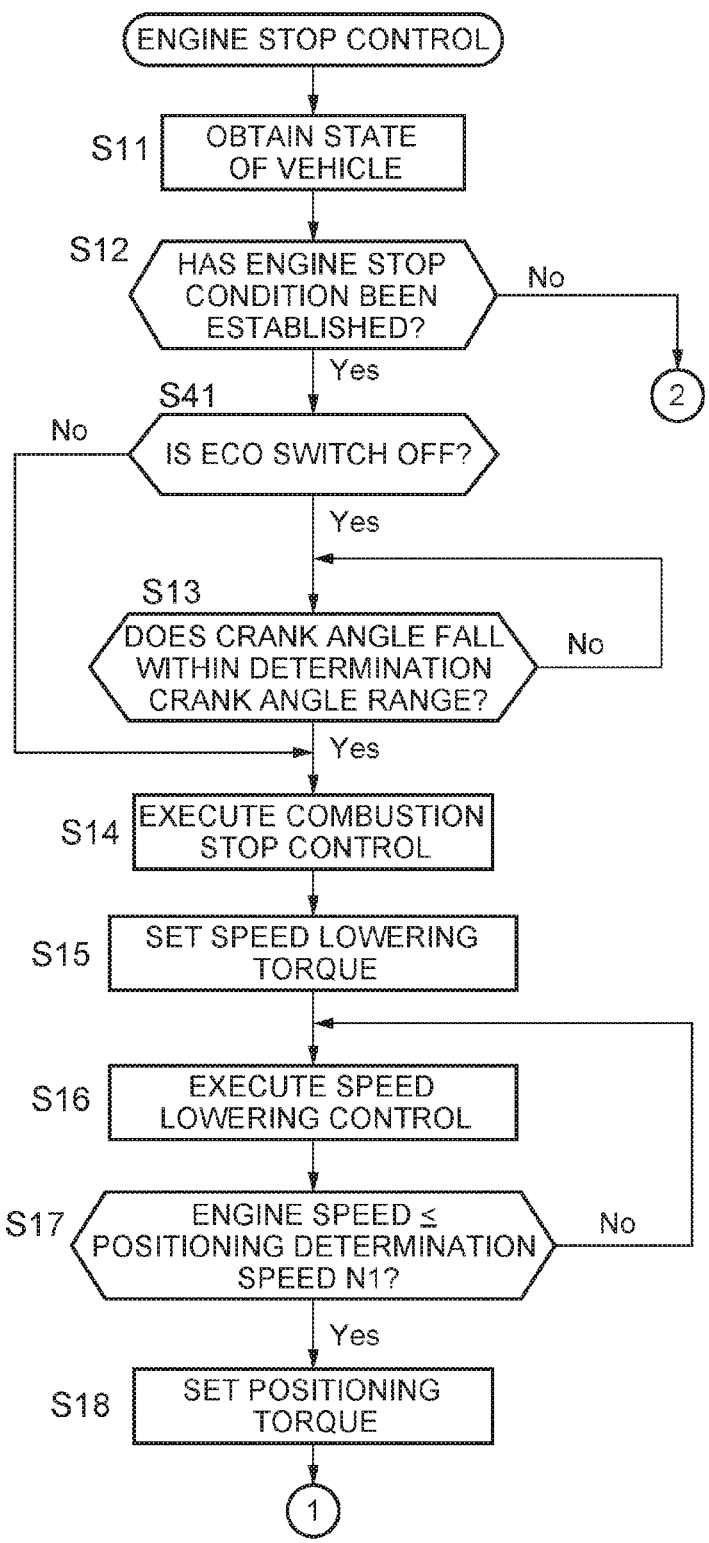
FIG. 13 is a flowchart of a part of an engine stop control routine that is executed by a vehicle control unit in a control apparatus according to a third embodiment of the invention.

FIG. 13 shows a part of the engine stop control routine that is executed by the vehicle control unit 30 in this embodiment. It should be noted that FIG. 13 is used instead of the part in FIG. 9 in the first embodiment. Thus, a part after FIG. 13, that is, the part in FIG. 10 is the same as the first embodiment also in the engine stop control routine of this embodiment.

Also in the engine stop control routine in this embodiment, the process proceeds in the similar manner to the first embodiment until step S12. If it is determined in step S12 that the engine stop condition has been established, the process proceeds to step S41, and the vehicle control unit 30 determines whether the ECO switch 33 is OFF. If it is determined that the ECO switch 33 is OFF, the process proceeds to step S13, and the process proceeds onward in the similar manner to the first embodiment. On the other hand, if it is determined that the ECO switch 33 is ON, the process proceeds to step S14, and the process proceeds onward in the similar manner to the first embodiment.

As it has been described so far, in this embodiment, step S13 is skipped when the ECO switch 33 is ON. Accordingly, a period from a time at which the engine stop condition is established to a time at which the combustion stop control is executed can be shortened. Therefore, fuel economy can be improved. On the other hand, step S13 is executed when the ECO switch 33 is OFF. Accordingly, the engine 11 is stopped in the state where the cylinder 11a of #2 is in the compression stroke. Therefore, the vibration of the vehicle 1 at the startup can be reduced.

The invention is not limited to each of the above-described embodiments and can be implemented in various embodiments. For example, the internal combustion engine to which the invention is applied is not limited to the internal combustion engine that is mounted in the hybrid vehicle. The invention may be applied to an internal combustion engine for a vehicle in which only the internal combustion engine is mounted as a power source.

In addition, the electric motor may be connected to the crankshaft of the internal combustion engine in a manner capable of transmitting the power. At this time, the electric motor may directly be connected to the crankshaft.

What is claimed is:

1. A control apparatus applied to a three-cylinder internal combustion engine that is mounted in a vehicle and in which an electric motor is connected to a crankshaft in a manner capable of transmitting power, the control apparatus comprising
control unit configured to control output torque of the electric motor at a time that the internal combustion engine is stopped such that the internal combustion engine is stopped in a state where a preset particular cylinder is in a compression stroke or an expansion stroke, wherein
the particular cylinder is a cylinder in which a mutually weakening relationship is established between a vibration component generated due to precession of the internal combustion engine in the case where the internal combustion engine is started from the state where said particular cylinder is in the compression stroke or the expansion stroke and a vibration component predicted to be generated in the vehicle in the case where it is assumed that torque to be applied to the crankshaft at a startup of the internal combustion engine is applied to the crankshaft in a state where a piston and a connecting rod of each cylinder are detached.

2. The control apparatus according to claim 1, wherein
in the case where a specified engine stop condition is established and a crank angle of the internal combustion engine falls within a preset specified determination crank angle range, the control unit is configured to stop combustion of the internal combustion engine and then executes speed lowering control for lowering a rotational speed of the crankshaft by outputting torque from the electric motor, and
a crank angle range in which the internal combustion engine is stopped in a state where the particular cylinder is in the compression stroke or the expansion stroke by starting the speed lowering control when the crank angle of the internal combustion engine falls within the determination crank angle range is set as the determination crank angle range.

3. The control apparatus according to claim 2, wherein
the vehicle is provided with an operation switch through which a driver commands the vehicle to travel in a mode that prioritizes fuel economy, and
the control unit is configured to
stop combustion of the internal combustion engine and then executes the speed lowering control in the case where the operation switch is OFF, the engine stop condition is established, and the crank angle of the internal combustion engine falls within the determination crank angle range, and
stop the combustion of the internal combustion engine and then executes the speed lowering control in the case where the operation switch is ON and the engine stop condition is established.

4. The control apparatus according to claim 1, wherein
in the case where the specified engine stop condition is established, the control unit configured to stop combustion of the internal combustion engine and then executes speed control for lowering a rotational speed of the crankshaft by outputting torque from the electric motor, and
a magnitude of the torque output from the electric motor in the speed control is set such that the particular cylinder is brought into the state of the compression stroke or the expansion stroke when the internal combustion engine is stopped.

* * * * *